United States Patent [19]

Bauer et al.

[11] Patent Number: 4,944,996
[45] Date of Patent: Jul. 31, 1990

[54] SEPARATING ELEMENT

[75] Inventors: Jean-Michel Bauer, Pagny S/Moselle; Jacques Maire, Paris; Maurice Verna, Nice, all of France

[73] Assignee: Le Carbone Lorraine, Courbevoie, France

[21] Appl. No.: 280,387

[22] Filed: Dec. 6, 1988

Related U.S. Application Data

[63] Continuation of Ser. No. 871,824, Jun. 9, 1986, abandoned.

[30] Foreign Application Priority Data

Jun. 10, 1985 [FR] France .................. 85 09264

[51] Int. Cl.$^5$ .................. B01D 39/20; B32B 5/24; C02F 1/44
[52] U.S. Cl. .................. 428/307.7; 156/89; 210/650; 210/653; 210/505; 210/509; 210/510.1; 423/447.2; 423/447.3; 423/447.4; 428/316.6; 428/408

[58] Field of Search .................. 428/408, 307.7, 316.6; 156/89; 210/653, 509, 510.1; 423/447.2, 447.3, 447.4

[56] References Cited

U.S. PATENT DOCUMENTS

| | | | |
|---|---|---|---|
| 3,829,327 | 8/1974 | Omori et al. | 427/249 |
| 3,960,601 | 6/1980 | Schulz . | |
| 4,434,206 | 2/1984 | Fukuda et al. | 428/408 |
| 4,442,165 | 4/1985 | Gebhardt et al. | 428/307.7 |
| 4,582,751 | 4/1986 | Vasilos et al. | 428/408 |
| 4,687,697 | 8/1987 | Combo | 210/509 |

*Primary Examiner*—James C. Cannon
*Attorney, Agent, or Firm*—Dennison, Meserole, Pollack & Scheiner

[57] ABSTRACT

The invention relates to a support intended to receive a mineral membrane for separation procedures, and processes for the production thereof. The support is formed by a carbon-carbon composite material of small thickness, which is mechanically strong and which is of a porous texture suited to the mineral membrane. It is produced by adjusting the porous texture of a carbon-carbon material.

15 Claims, No Drawings

SEPARATING ELEMENT

This is a continuation of co-pending application Ser. No. 871,824 filed on June 9, 1986, and now abandoned.

BACKGROUND OF THE INVENTION

The invention relates to a support for receiving a mineral membrane for separation procedures, and the processes for the production of the support.

In separation procedures, processes such as reverse osmosis, ultrafiltration and microfiltration use either organ membranes or, for a number of years now, mineral membranes. Depending on the type of use, such membranes must have suitable, small pore dimensions and a minimum thickness in order to permit a substantial flow rate without an excessive pressure drop. As regards mineral membranes, they must be provided with a mechanically strong support.

It should be noted that the porous texture of the support must be suited to the mineral membrane selected.

It has been found that, in order to provide satisfactory mechanical characteristics, in particular in regard to resistance to bursting, flexing and squashing of tubes, the support must be thick, and that is a handicap in regard to achieving the highest possible degree of permeability.

SUMMARY OF THE INVENTION

The principal object of the invention is to overcome the above disadvantage while providing a support which retains its mechanical strength and a suitable porous texture.

This object is achieved according to the invention which comprises a support intended to receive a mineral membrane characterized in that it is formed of a carbon-carbon composite material of small thickness, e.g. 0.5 to 2 mm, which is mechanically strong and which is of a porous texture suited to the mineral membrane.

The mechanical strength of the composite is such that bursting pressure is generally at least about 50 bars. The porosity of the composite is generally on the order of 30 to 40%.

DETAILED DESCRIPTION OF THE INVENTION

The carbon-carbon composite material of the present invention may be selected from porous composite materials comprising a substrate of carbon felts, cloths or fibers, alone or in association, and a carbon matrix.

The support may occur in different forms such as plates, tubes, etc...

There are many processes for the production of carbon-carbon composite materials of various forms.

One such process known is to shape a carbon-carbon composite material, i.e., a substrate of carbon textile material (fibre and/or cloth and/or felt, etc...) which is made rigid by carbon bonding This bonding may be produced by impregnating the substrate with a carbonisable resin before the shaping thereof, or by depositing carbon from the vapour phase after the substrate has been shaped.

The production of such structures results in materials which are strong and rigid, even when small in thickness. However, the texture thereof remains relatively coarse and pores of substantial size are evident (between the meshes) after the materials have been made rigid. Such large pores make the materials useless as supports for separation procedures.

In order to make such materials suitable for such use, the invention provides carrying out adjustment in respect of their porosity. Such adjustment may be achieved by impregnation of carbonisable material followed by carbonisation.

The carbonisation process may be the conventional chemical vapor deposition process utilizing thermal cracking gaseous hydrocarbon compounds at 600–1200° C. Such a process is discussed in Davis et al, Nature, 171 (1953), p. 756.

A plurality of impregnation-carbonisation cycles may necessary in order to arrive at the required porous texture. Good results in carbonisation can be achieved by impregnating with mixtures of pitch and furfural, catalysed with ethyl sulphate. The carbonisation of such mixtures results in products which have very high proportions of coke occuring in globular-like form in the largest pores. It is also possible to use phenolic and furanic resins and pitches for carbonisation.

Adjustment of the porosity may also be achieved by depositing carbon from the vapour phase, alone or in combination with impregnation-carbonisation of a carbonisable material.

It should be noted that in every case the mechanical characteristics of the composite materials when treated in that way are further improved.

For the purposes of producing forms of carbon-carbon composite materials which have been rendered rigid, it has bee stated above that it is possible to use a substrate of carbon textile material, such as fibre and/or cloth and/or felt. Cloths weighing 300 g/m2 or cloths weighing 400 g/m2, in association with a mat of fibres which are disposed in a random fashion are particularly suitable for producing the supports according to the invention. It is also possible to use in the same fashion, either alone or in association, fibres, cloths o felts of cross-linked polymers which will subsequently be carbonised in the treatment for making them rigid.

When the treatment for making the materials rigid involves using a carbonisable resin, the resin used will preferably be such as to permit a high coke content (higher than 50%). Phenolic resins are particularly suitable in that respect.

Shaping of the composite materials to put them into the desired form of the support may be effected by any suitable known process, such as rolling filaments or winding cloths or felts for producing tubes, or forming stacks of cloths or felt for the purpose of producing plates.

However, one process is particularly suitable from the economic point of view when the operation of making the material rigid involves using a carbonisable resin. That is the continuous process which is referred to as 'pultrusion'. It makes it possible to produce structures which inter alia associate cloths and felts with each other. Instead of drawing, as in the usual process, 'rovings'of long fibres which are pre-impregnated and then saturated with resin, in a die for shaping thereof and polymerisation thereof, a carbon felt and a cloth are used and they are drawn at the same time. Those materials are also saturated with resin at the entrance into or in the shaping die. The composite material which is produced in that way is rigid; it is then carbonised in the absence of air at a temperature higher than the temperature or use of the support.

The supports according to the invention are particularly suitable for the production of separating element of mineral membrane type, which can be used in separating procedures such as reverse osmosis, ultrafiltration and microfiltration.

It should be noted that the support materials may also be used as they are, without the addition of a mineral membrane, as separating elements for tangential microfiltration.

What is claimed is:

1. A separating element comprising a porous mineral membrane sintered to the face of a carbon-carbon composite material of small thickness permitting high permeability, which is of a strength adapted to resist bursting and which is of a porous texture suited to the mineral membrane.

2. A separating element according to claim 1, wherein the carbon-carbon composite material comprises a carbon matrix and a substrate selected from the group consisting of porous carbon felts, cloths and fibers alone or in association.

3. A separating element according to claim 1 or 2 in the form of a tube.

4. A separating element according to claim 1 or 2 in the form of a plate.

5. A separating element according to claim 1 or 2, wherein said thickness is about 0.5 to 2 mm.

6. A separating element according to claim 1 or 2, wherein the bursting strength of said composite is at least 50 bars.

7. A support according to claim 1 or 2, wherein the porosity of said composite is about 30 to 40%.

8. In a separating element comprising a porous mineral membrane sintered to the face of a support, the improvement wherein said support comprises a carbon-carbon composite of small thickness permitting high permeability, of a strength adapted to resist bursting, and having a porous texture suited to the mineral membrane.

9. A process for the production of a separating element comprising the steps of forming a carbon-carbon composite support from a fibrous carbon textile material by shaping said material, bonding said fibers with carbon to make the material rigid, and adjusting the porosity of said material, depositing on said support a mineral membrane of desired porosity and bonding said support and mineral membrane by sintering.

10. A process according to claim 9, wherein said adjusting step is effected by impregnation of the textile with a carbonisable material, followed by carbonising.

11. A process according to claim 10, wherein said impregnation and carbonisation are repeated at least once.

12. A process according to claim 9, wherein said adjusting step is effected by depositing carbon from the vapour phase.

13. A process according to claim 12, additionally comprising impregnating the textile with a carbonisable material, followed by carbonising.

14. A process according to claim 10, wherein the carbonisable material is selected from the group consisting o furanic resins, pitches and mixtures of pitch and furfural, catalysed with ethyl sulphate.

15. A process according to claim 12, wherein the carbonisable material is selected from the group consisting o phenolic and furanic resins, pitches and mixtures of pitch an furfural, catalysed with ethyl sulphate.

* * * * *

UNITED STATES PATENT AND TRADEMARK OFFICE
CERTIFICATE OF CORRECTION

PATENT NO.    : 4,944,996
DATED         : July 31, 1990
INVENTOR(S)   : Jean-Michel BAUER et al It is certified that error appears in the above-identified patent and that said Letters Patent is hereby corrected as shown below:

Column 1, line 59, insert --.-- after "bonding".

Column 2, line 13, after "may" insert --be--;

Column 2, line 32, change "bee" to --been--;

Column 2, line 39, change "o" to --or--.

Claim 14, line 3, change "o" to --of--.

Claim 15, line 3, change "o" to --of--.

Signed and Sealed this

Twenty-ninth Day of October, 1991

Attest:

HARRY F. MANBECK, JR.

*Attesting Officer*    *Commissioner of Patents and Trademarks*